(12) United States Patent
Bhutta et al.

(10) Patent No.: US 10,572,434 B2
(45) Date of Patent: Feb. 25, 2020

(54) INTELLIGENT CERTIFICATE DISCOVERY IN PHYSICAL AND VIRTUALIZED NETWORKS

(71) Applicant: International Business Machines Corporation, Armonk, NY (US)

(72) Inventors: Haseeb A. Bhutta, Houston, TX (US); Sheldon Lu, Shanghai (CN); Viter Zhong, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 15/442,946

(22) Filed: Feb. 27, 2017

(65) Prior Publication Data

US 2018/0246840 A1  Aug. 30, 2018

(51) Int. Cl.
*G06F 13/40* (2006.01)
*G06F 13/42* (2006.01)
*G06F 11/14* (2006.01)
*G06F 9/4401* (2018.01)

(52) U.S. Cl.
CPC ........ *G06F 13/4282* (2013.01); *G06F 13/404* (2013.01); *G06F 9/4403* (2013.01); *G06F 11/1438* (2013.01); *G06F 11/1441* (2013.01); *G06F 13/4022* (2013.01); *G06F 2213/0026* (2013.01)

(58) Field of Classification Search
CPC ............. G06F 13/4022; G06F 13/4282; G06F 13/404; G06F 13/16; G06F 13/4081; G06F 2213/0026; G06F 11/1441; G06F 11/1438; G06F 9/4403
See application file for complete search history.

(56) References Cited

U.S. PATENT DOCUMENTS

| | | | |
|---|---|---|---|
| 6,513,114 B1 | 1/2003 | Wu et al. | |
| 7,500,094 B2 | 3/2009 | Phelps et al. | |
| 7,552,475 B2 | 6/2009 | Piwonka et al. | |
| 8,312,257 B2 | 11/2012 | Tabuchi et al. | |
| 8,677,023 B2 | 3/2014 | Venkataraghavan et al. | |
| 9,088,495 B2 | 7/2015 | Ajanovic et al. | |
| 2014/0112339 A1 | 4/2014 | Safranek et al. | |
| 2016/0267035 A1* | 9/2016 | Murphy | G06F 13/368 |
| 2017/0068636 A1* | 3/2017 | Vishwanathan | G06F 13/4282 |

* cited by examiner

*Primary Examiner* — Ernest Unelus
(74) *Attorney, Agent, or Firm* — Francis Lammes; Stephen J. Walder, Jr.; Wenjie Li (57) ABSTRACT

A mechanism for enumerating Peripheral Component interconnect (PCI) Express (PCIe) devices within a data processing system is provided. Responsive to a reset of the data processing system, Peripheral Component interconnect (PCI) enumeration information for a set of PCIe devices coupled to the data processing system is read from a processor register. The PCI enumeration information is stored in an address space. PCI enumeration of the PCIe devices is skipped and the PCI enumeration information stored in the address space is presented to the operating system (OS) of the data processing system in order that the OS maintaining the PCIe devices using the PCI enumeration information.

14 Claims, 4 Drawing Sheets

INTELLIGENT CERTIFICATE DISCOVERY IN PHYSICAL AND VIRTUALIZED NETWORKS

BACKGROUND

The present application relates generally to an improved data processing apparatus and method and more specifically to mechanisms for intelligent certificate discovery in physical and virtualized networks.

Peripheral Component Interconnect (PCI) devices have a set of registers referred to as configuration space and PCI Express (PCIe) introduces extended configuration space for PCIe devices. Configuration space registers are mapped to memory locations. Device drivers and diagnostic software must have access to the configuration space, and operating systems typically use Application Program Interfaces (APIs) to allow access to device configuration space. When the operating system does not have access methods defined or APIs for memory mapped configuration space requests, the driver or diagnostic software has the burden to access the configuration space in a manner that is compatible with the operating system's underlying access rules. In all systems, device drivers are encouraged to use APIs provided by the operating system to access the configuration space of the device.

To address a PCIe device, the PCIe device must be enabled by being mapped into the system's Input/Output (I/O) port address space or memory-mapped address space. The Basic Input/Output System (BIOS) programs the Base Address Registers (commonly called BARs) to inform the device of its address mapping by writing configuration commands to the PCI controller. Because all PCIe devices are in an inactive state upon system reset, they will have no addresses assigned to them by which the operating system or device drivers can communicate with them. The BIOS geographically addresses the PCI slots (for example, the first PCIe slot, the second PCIe slot, or the third PCIe slot, etc., on the motherboard) through the PCI controller using per slot Initialization Device Select (IDSEL) signals.

Since there is no direct method for the BIOS to determine which PCI slots have devices installed (nor which functions the device implements) the PCI bus(es) must be enumerated. Bus enumeration is performed by attempting to read the Device ID (DID) register and Vendor ID (VID) register for each combination of bus number and PCIe device number at the device's function #0. Note that device number, different from DID, is merely a device's sequential number on that bus, moreover, after a new bridge a new bus number is defined and device enumeration restart by zero.

If no response is received from the device's function #0, the bus master performs an abort and returns an all-bits-on value (FFFFFFFF in hexadecimal), which is an invalid VID/DID value, thus a device driver can tell that the specified combination bus/device_number/function (B/D/F) is not present. So, when a read to a function ID of zero for a given bus/device causes the master (initiator) to abort, it must then be presumed that no working device exists on that bus because devices are required to implement function number zero. In this case, reads to the remaining functions numbers (1-7) are not necessary as they also will not exist.

When a read to a specified B/D/F combination for the vendor ID register succeeds, the PCI controller knows that the PCIe device exists. Thus, the PCI Controller writes all ones to its BARs and reads back the PCIe device's requested memory size in an encoded form. The design implies that all address space sizes are a power of two and are naturally aligned.

At this point, the BIOS programs the memory-mapped and I/O port addresses into the PCIe device's BAR configuration register. These addresses stay valid as long as the system remains turned on. Upon power-off or system reset, all these settings are lost and the procedure is repeated next time the system is powered back on. Since this entire process is fully automated, the user is spared the task of configuring any newly added hardware manually by changing dual in-line package (DIP) switches on the cards themselves. This automatic device discovery and address space assignment is how plug and play is implemented.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for enumerating Peripheral Component Interconnect (PCI) Express (PCIe) devices within the data processing system. The illustrative embodiment reads Peripheral Component Interconnect (PCI) enumeration information for a set of PCIe devices coupled to the data processing system from a processor register in response to a reset of the data processing system. The illustrative embodiment stores the PCI enumeration information in an address space. The illustrative embodiment skips PCI enumeration of the PCIe devices. The illustrative embodiment presents the PCI enumeration information in the address space to the operating system (OS) of the data processing system in order that the OS maintaining the PCIe devices using the PCI enumeration information.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As noted above, to address a Peripheral Component Interconnect Express (PCIe) device, the PCIe device must be enabled by being mapped into the system's Input/Output (I/O) port address space or memory-mapped address space. The Basic Input/Output System (BIOS) programs the Base Address Registers (BARs) to inform each PCIe device of its address mapping by writing configuration commands to the PCI controller. Because all PCIe devices are in an inactive state upon system reset, they will have no addresses assigned to them by which the operating system or device drivers can communicate with them. The BIOS geographically addresses the PCIe slots (for example, the first PCIe slot, the second PCIe slot, or the third PCIe slot, etc., on the motherboard) through the PCI controller using a per slot Initialization Device Select (IDSEL) signals. Once the Device ID (DID) register and Vendor ID (VID) register for each combination of bus number and device number at the PCIe device's function #0 are identified, the BIOS programs the memory-mapped and I/O port addresses into the PCI device's BAR configuration register. These addresses stay valid as long as the system remains turned on. Upon power-off or system reset, all these settings are lost and the procedure is repeated next time the system is powered back on.

Thus, currently, each time a data processing system is powered off or reset, when the data processing system a system powers up during Power-On Self-Test (POST), the central processing unit (CPU) sends a PCIe reset signal to all the downstream PCI devices signaling that the PCIe devices need to be ready for BIOS's PCIe bus enumeration. Then, one the BIOS identifies the various downstream PCIe devices, the BIOS performs a PCIe link down and then PCIe link up to make sure the physical link is robust and there are no issues, assigns bus, device, and function numbers, and assigns BARs so the PCIe devices have a way to send/receive data from main memory. Once the BIOS is done with this PCIe enumeration process, the BIOS has a table of all the PCIe devices and their corresponding memory/I/O addresses.

Before the BIOS transitions to operating system (OS), the BIOS presents this information to the OS and now the OS is responsible for maintaining the PCIe devices. When a user tells the OS to reset the system, the downstream PCIe devices are told via in-band signaling that they are going to be reset and they will need to retrain themselves. Besides the in-band signaling, the CPU also sends a PCIe reset which will make the downstream PCIe devices listen for PCIe training sequences and re-establish the links and speeds.

However, as described above, each time the data processing system is powered off or reset, any data that is in flight will be lost and, in many data processing systems, data that is in flight should not be stopped. Thus, the illustrative embodiments provide for, preventing inflight data from being lost by not enumerating the PCIe devices and keeping the BARs and other information static, which are given directly to the OS as it boots. That is, the illustrative embodiments prevent the PCIe in-band reboot commands from being sent to a PCIe switch via the CPU. While the in-flight data may be stopped when the BIOS enumerates the PCIe buses which causes physical PCIe link down and link up, in order to not lose in-flight data, the BIOS reserves a fixed memory/IO address range for PCIe switch downstream PCIe devices. On a power cycle (during POST), the BIOS allocates all resources in this range for PCIe switch downstream devices. The BIOS uses a register, which may be, for example, a "Scratch Pad" register in the CPU, to write some data to determine whether a system reset or a power cycle has occurred. While on a power cycle all power is lost and the register will go to the default value, on a system reset all power has not gone down and the register information will be maintained. Therefore, on a system reset (during POST), the BIOS reserves the PCIe switch's fixed range resources at the very beginning to prevent the CPU from using them on the subsequent POST. Thus, in the PCI enumeration phase, the BIOS skips initialization of all the PCIe devices connected to PCIe switch. Thus, all the BARs and other information related to the PCIe devices coupled to the PCIe switches remains unchanged and inflight data resumes as soon as the BIOS passes operation to the OS.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
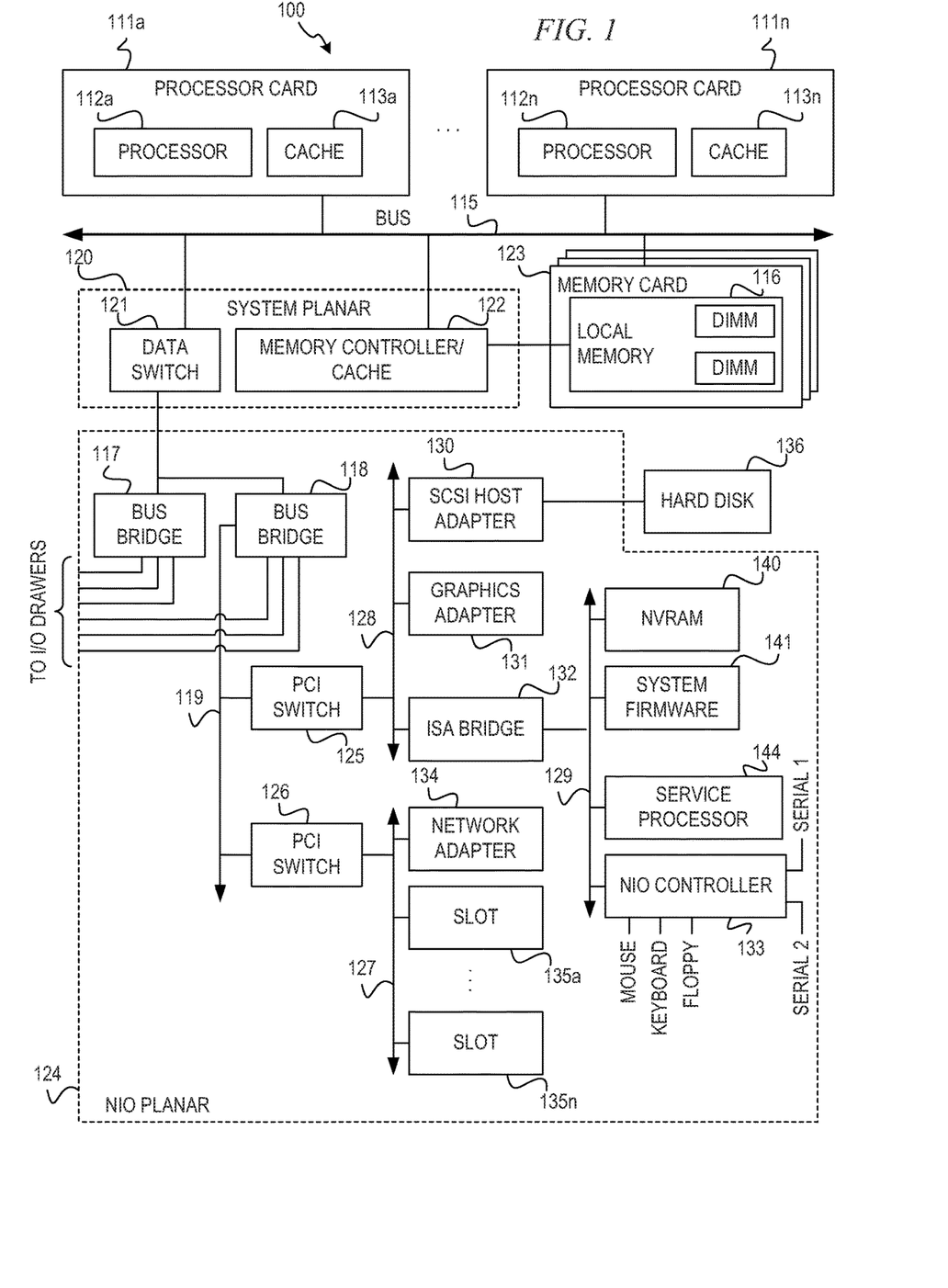
FIG. 1 depicts a block diagram of a data processing system with which aspects of the illustrative embodiments may advantageously be utilized.

Thus, the illustrative embodiments may be utilized in many different types of data processing environments. In order to provide a context for the description of the specific elements and functionality of the illustrative embodiments, FIG. 1 is provided hereafter as an example environment in which aspects of the illustrative embodiments may be implemented. It should be appreciated that FIG. 1 is only an example and are not intended to assert or imply any limitation with regard to the environments in which aspects or embodiments of the present invention may be implemented. Many modifications to the depicted environments may be made without departing from the spirit and scope of the present invention.

FIG. 1 depicts a block diagram of a data processing system with which aspects of the illustrative embodiments may advantageously be utilized. As shown, data processing system 100 includes processor cards 111a-111n. Each of processor cards 111a-111n includes a processor and a cache memory. For example, processor card 111a contains processor 112a and cache memory 113a, and processor card 111n contains processor 112n and cache memory 113n.

Processor cards 111a-111n are connected to main bus 115. Main bus 115 supports a system planar 120 that contains processor cards 111a-111n and memory cards 123. The system planar also contains data switch 121 and memory controller/cache 122. Memory controller/cache 122 supports memory cards 123 that include local memory 116 having multiple dual in-line memory modules (DIMMs).

Data switch 121 connects to bus bridge 117 and bus bridge 118 located within a native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via small computer system interface (SCSI) host adapter 130. A graphics adapter 131 may be directly or indirectly connected to PCI bus 128. PCI bridge 126 provides connections for external data streams through network adapter 134 and adapter card slots 135a-135n via PCI bus 127.

An industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection, keyboard connection, and mouse connection are provided by NIO controller 133 to allow data processing system 100 to accept data input from a user via a corresponding input device. In addition, non-volatile RAM (NVRAM) 140 provides a non-volatile memory for preserving certain types of data from system disruptions or system failures, such as power supply problems. A system firmware 141 is also connected to ISA bus 129 for implementing the initial Basic Input/Output System (BIOS) functions. A service processor 144 connects to ISA bus 129 to provide functionality for system diagnostics or system servicing.

The operating system (OS) is stored on hard disk 136, which may also provide storage for additional application software for execution by data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel type from hard disk 136, loads the OS into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN).

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device that is configured with flash memory to provide non-volatile memory for storing operating system files and/or user-generated data, for example. Essentially, data processing system 100 may be any known or later developed data processing system without architectural limitation.

Figure 2:
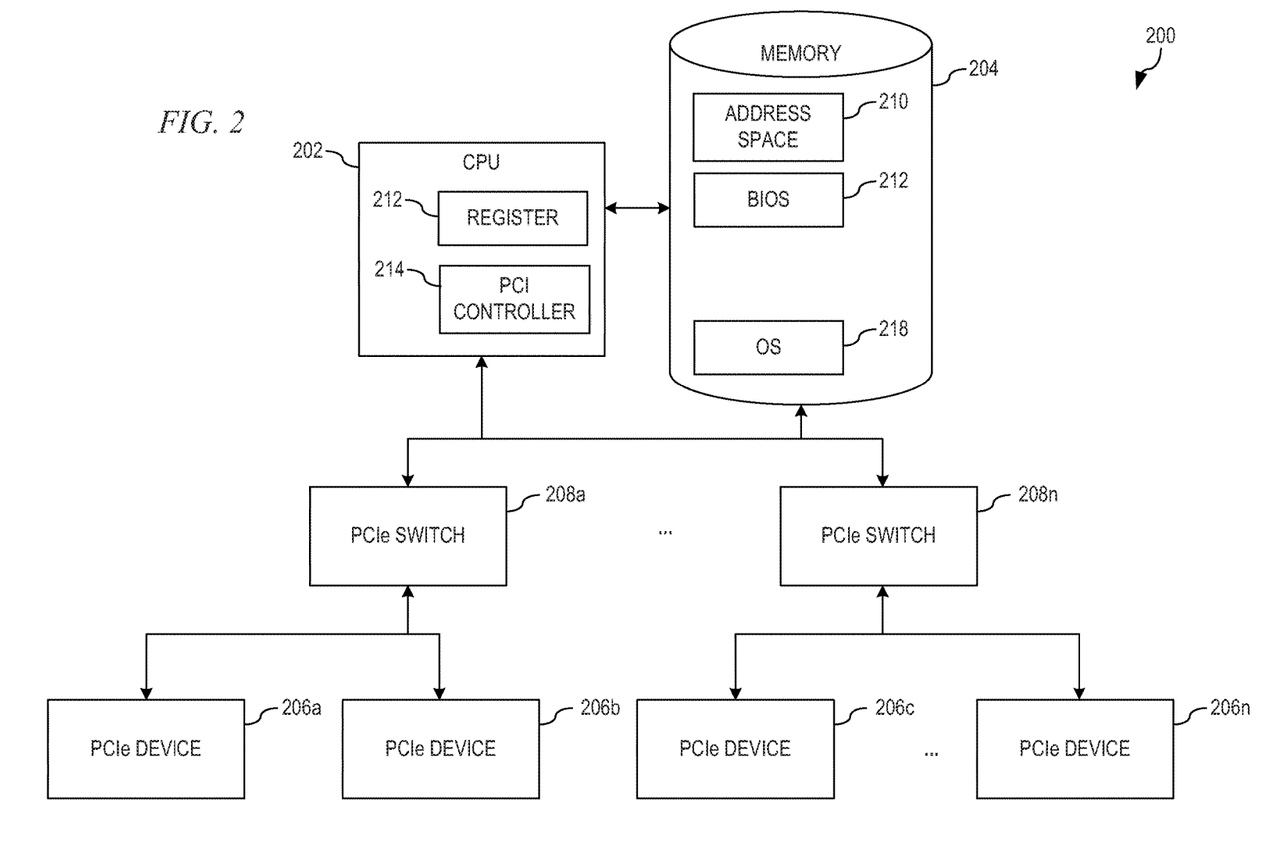
FIG. 2 depicts a function block diagram of a Basic Input/Output System (BIOS) Peripheral Component Interconnect (PCI) Express (PCIe) enumeration in accordance with an illustrative embodiment.

FIG. 2 depicts a function block diagram of a Basic Input/Output System (BIOS) Peripheral Component Interconnect (PCI) Express (PCIe) enumeration in accordance with an illustrative embodiment. Data processing system 200, which may be a data processing system such as data processing system 100 of FIG. 1, comprises one or more central processing unit (CPU) 202, memory 204, and a plurality of PCIe devices 206a-206n coupled to memory 204 via one or more PCIe switches 208a-208n. To address each of PCIe devices 206a-206n, each of PCIe devices 206a-206n must be enabled by being mapped into data processing system's 200 Input/Output (I/O) port address space or memory-mapped address space 210 within memory 204. To do this, when data processing system 200 is initially powered on BIOS 212 within memory 204 begins a bus enumeration process by identifying, via PCI controller 214, which PCI slots have PCIe devices installed. PCI controller 214 attempts to read the Device ID (DID) register and Vendor ID (VID) register for each combination of bus number and PCIe device number at the PCIe device's function #0. Note that PCIe device number, different from DID, is merely a PCIe device's sequential number on that PCI bus associated with a particular PCIe switch. Moreover, after a new PCIe switch, a new PCI bus number is defined and PCIe device enumeration restarts by zero.

If no response is received from the PCIe device's function #0, PCI controller 214 performs an abort and returns an all-bits-on value (FFFFFFFF in hexadecimal), which is an invalid VID/DID value, to BIOS 212. Thus, PCI controller 214 is able to identify that the specified combination bus/device_number/function (B/D/F) is not present. So, when a read to a function ID of zero for a given PCI bus/PCIe device causes PCI controller 214 to abort, BIOS 212 presumes that no working PCIe device exists on that bus/port because PCIe devices are required to implement function number zero. In this case, reads to the remaining functions numbers (1-7) are not necessary as they also will not exist.

When a read to a specified B/D/F combination for the vendor ID register succeeds, PCI controller 214 identifies that the PCIe device exists and runs a bus enumeration process. In the bus enumeration process, PCI controller 214 via BIOS 212 writes all ones to the Base Address Registers (BARs) associated with the PCIe device and reads back the PCIe device's requested memory size in an encoded form. At this point, BIOS 212 programs the memory-mapped and port addresses into the PCIe device's BAR configuration register, i.e. Input/Output (I/O) port address space or memory-mapped address space 210. These addresses stay valid as long as the system remains turned on. BIOS 212 then stores the information in Input/Output (I/O) port address space or memory-mapped address space 210 to CPU register 216 in CPU 202. BIOS 212 and PCI controller 214 repeat the process for each identified PCIe device. Once BIOS 212 is done with this PCIe enumeration process, BIOS 212 has a table of all the PCIe devices and their corresponding memory/I/O addresses in (I/O) port address space or memory-mapped address space 210. BIOS 212 presents this information to operating system (OS) 218 and now OS 218 is responsible for maintaining PCIe devices 206a-206n.

Once control has been handed off to OS 218, BIOS 212 monitors for a system reset. Again, on a power cycle all power within data processing system 200 is lost and CPU register 216 will revert to a default value. However, on a system reset all power within data processing system has not gone down and CPU register 216 information will be maintained. Thus, if BIOS 212 detects a system reset, BIOS reads the information from CPU register 216. BIOS 212 stores the information in (I/O) port address space or memory-mapped address space 210 and then skips PCI enumeration of devices. BIOS 212 has a table of all the PCIe devices and their corresponding memory/I/O addresses in (I/O) port address space or memory-mapped address space 210. BIOS 212 presents this information to operating system (OS) 218 and now OS 218 is responsible for maintaining PCIe devices 206a-206n. Thus, all the BARs and other information related to PCIe devices 206a-206n coupled to the PCIe switches 208a-208n remains unchanged and inflight data continues as BIOS 212 passes operation to OS 218.

The present invention may be a system, a method, and/or a computer program product. The computer program product may include a computer readable storage medium (or media) having computer readable program instructions thereon for causing a processor to early out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 3:
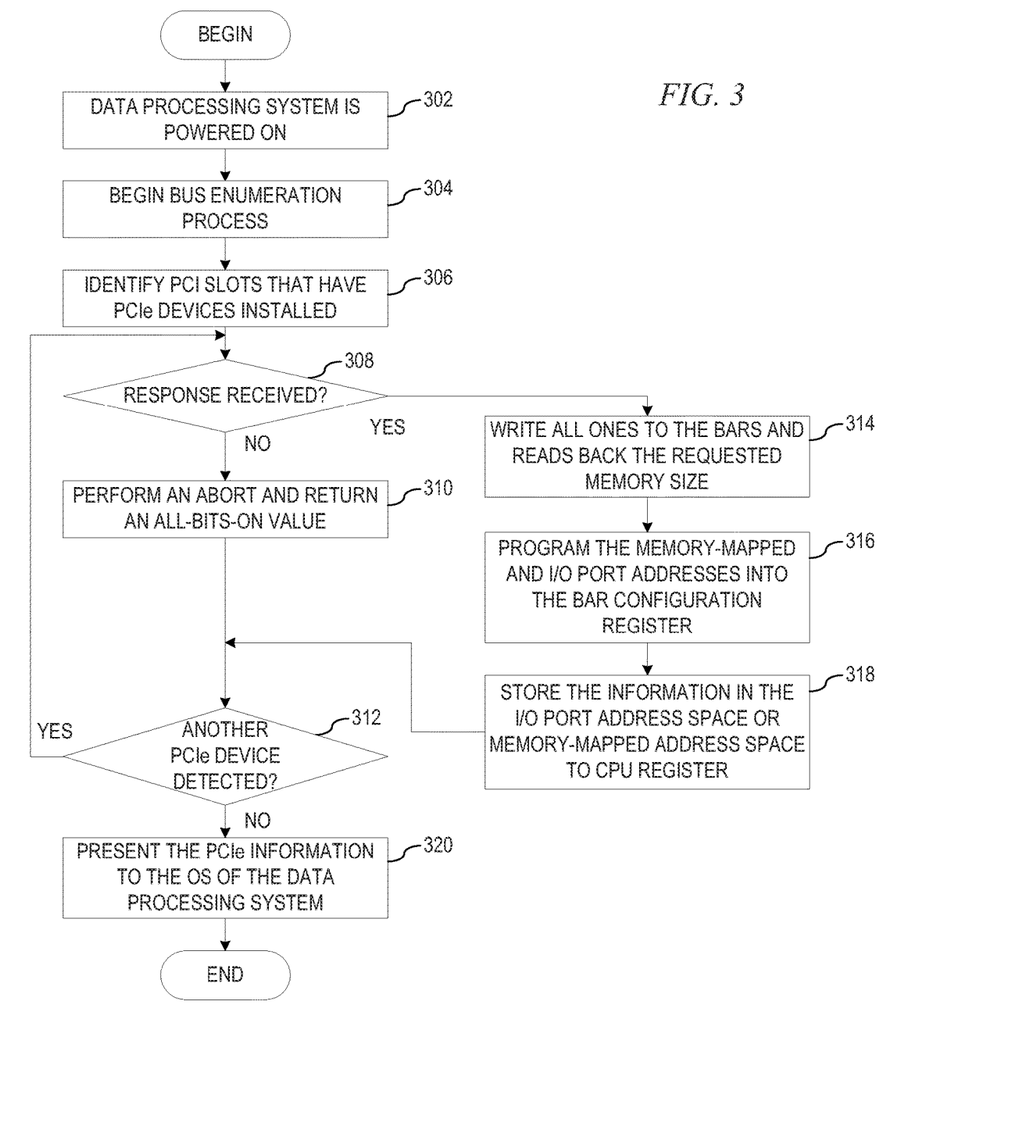
FIG. 3 depicts a flow diagram of the operation performed in enumerating PCIe devices within a data processing system in accordance with an illustrative embodiment.

FIG. 3 depicts a flow diagram of the operation performed in enumerating PCIe devices within a data processing system in accordance with an illustrative embodiment. As the operation begins, the data processing system is powered on (step 302). The BIOS within a memory of the data processing system begins a bus enumeration process (step 304). A PCI controller identifies PCI slots that have PCIe devices installed (step 306) and attempts to read the Device ID (DID) register and Vendor ID (VID) register for each combination of bus number and PCIe device number at the PCIe device's function #0 (step 308). If at step 308 no response is received from the PCIe device's function #0, the PCI controller performs an abort and returns an all-bits-on value (FFFFFFFF in hexadecimal), which is an invalid VID/DID value, to the BIOS (step 310). Thus, the PCI controller is able to identify that the specified combination bus/device_number/function (B/D/F) is not present. So, when a read to a function ID of zero for a given bus/PCIe device causes the PCI controller to abort, the BIOS presumes that no working PCIe device exists on that bus/port because PCIe devices are required to implement function number zero. In this case, reads to the remaining functions numbers (1-7) are not necessary as they also will not exist. The BIOS then determines whether there is another PCIe device detected (step 312). If at step 312 there is another PCIe device, the operation returns to step 308.

If at step 308 a read to a specified B/D/F combination for the vendor ID register succeeds, the PCI controller identifies that the PCIe device exists and runs a bus enumeration process. In the bus enumeration process, the PCI controller via the BIOS writes all ones to the Base Address Registers (BARS) associated with the PCIe device and reads back the PCIe device's requested memory size in an encoded form (step 314). The BIOS then programs the memory-mapped and I/O port addresses into the PCIe device's BAR configuration register, i.e. an Input/Output (I/O) port address space or memory-mapped address space (step 316). These addresses stay valid as long as data processing system has power. The BIOS then stores the information in the Input/Output (I/O) port address space or memory-mapped address space to CPU register in a CPU of the data processing system (step 318). The operation then processed at step 312. If at step 312 there is another PCIe device, the operation returns to step 308. If at step 312 there is no other PCIe device, the BIOS presents the PCIe information to the operating system (OS) of the data processing system (step 320) and now the OS is responsible for maintaining the identified PCIe devices. The operation ends thereafter.

Figure 4:
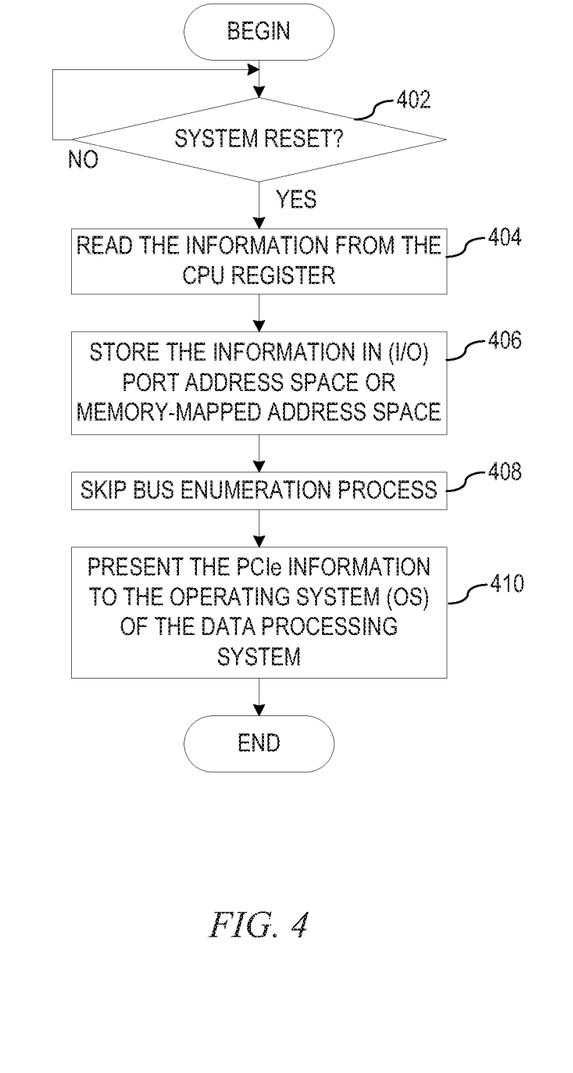
FIG. 4 depicts a flow diagram of the operation performed in enumerating PCIe devices within a data processing system in accordance with an illustrative embodiment.

FIG. 4 depicts a flow diagram of the operation performed in enumerating PCIe devices within a data processing system in accordance with an illustrative embodiment. As the operation begins, the BIOS monitors for a system reset (step 402). Again, on a power cycle all power within the data processing system is lost and the CPU register will revert to a default value. However, on a system reset all power within data processing system has not gone down and the CPU register information will be maintained. Thus, if at step 402 the BIOS detect a system reset, the BIOS reads the information from the CPU register (step 404). The BIOS stores the information in (I/O) port address space or memory-mapped address space (step 406) and then skips PCI enumeration (step 408). The BIOS presents this information to the OS (step 410) and now the OS is responsible for maintaining the PCIe devices. Thus, all the BARs and other information related to the PCIe devices coupled to the PCIe switches remains unchanged and inflight data continues as BIOS passes operation to the OS. The operation ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for preventing inflight data from being lost by not enumerating the PCIe devices in the event of a system reset and keeping the BARs and other information static, which are given directly to the OS as it boots. That is, the illustrative embodiments prevent the PCIe in-band reboot commands from being sent to a PCIe switch via the CPU. While the in-flight data may be stopped when the BIOS enumerates the PCIe buses which causes physical PCIe link down and link up, in order to not lose in-flight data, the BIOS reserves a fixed memory/IO address range for PCIe switch downstream PCIe devices. On a power cycle (during POST), the BIOS allocates all resources in this range for PCIe switch downstream devices. The BIOS uses a register, which may be, for example, a "Scratch Pad" register in the CPU, to write some data to determine whether a system reset or a power cycle has occurred. While on a power cycle all power is lost and the register will go to the default value, on a system reset all power has not gone down and the register information will be maintained. Therefore, on a system reset (during POST), the BIOS reserves the PCIe switch's fixed range resources at the very beginning to prevent the CPU from using them on the subsequent POST. Thus, in the enumeration phase, the BIOS skips initialization of all the PCIe devices connected to PCIe switch. Thus, all the BARs and other information related to the PCIe devices coupled to the PCIe switches remains unchanged and inflight data resumes as soon as the BIOS passes operation to the OS.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art, to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for enumerating Peripheral Component Interconnect (PCI) Express (PCIe) devices within the data processing system, the method comprising:

responsive to a reset of the data processing system, reading Peripheral Component Interconnect (PCI) enumeration information for a set of PCIe devices coupled to the data processing system from a processor register in a processor of the data processing system, wherein, in the reset of the data processing system, all power within the data processing system has not gone down and the PCI enumeration information in the processor register in the processor of the data processing system is maintained and wherein, in the reset of the data processing system, the PCI enumeration information in an address space in a memory of the data processing system is lost;

storing the PCI enumeration information in the address space in the memory of the data processing system;

skipping PCI enumeration of the PCIe devices; and presenting the PCI enumeration information in the address space in the memory of the data processing system to the operating system (OS) of the data processing system in order that the OS maintains the PCIe devices using the PCI enumeration information.

2. The method of claim 1, wherein the address space in the memory of the data processing system is at least one of an input/output (I/O) port address space or a memory-mapped address space.

3. The method of claim 1, wherein the PCI enumeration information is initially populated in the processor register in the processor by the method comprising:

responsive to the data processing system being powered on, identifying PCI slots that have PCIe devices installed;

reading a Device ID (DID) register and Vendor ID (VID) register for each combination of bus number and PCIe device number;

for each PCIe device that responds to the reading of the DID register and the VID register:
responsive to receiving a response from a PCIe device, running a bus enumeration process;
programming one or more addresses into the address space there by forming the PCI enumeration information; and
storing the PCI enumeration information in the processor register in the processor; and
presenting the PCI enumeration information to the operating system (OS) of the data processing in order that the OS maintains the PCIe devices using the PCI enumeration information.

4. The method of claim 3, wherein, in running the bus enumeration process, the response from the PCIe device causes all ones to be written to the address space for that PCIe device.

5. The method of claim 3, further comprising:
for each failure in reading of the DID register and the VID register a particular combination of bus number and PCIe device number:
performing an abort; and
returning an all-bits-on value indicating that no working PCIe device exists on that bus number and PCIe device number.

6. A computer program product comprising a non-transitory computer readable storage medium having a computer readable program stored therein, wherein the computer readable program, when executed on a computing device, causes the computing device to:
responsive to a reset of the computing device, read Peripheral Component Interconnect (PCI) enumeration information for a set of Peripheral Component Interconnect (PCI) Express (PCIe) devices coupled to the computing device from a processor register in a processor of the computing device, wherein in the reset of the computing device, all power within the computing device has not gone down and the PCI enumeration information in the processor register in the processor of the computing device is maintained and wherein, in the reset of the computing device, the PCI enumeration information in an address space in a memory of the computing device is lost;
store the PCI enumeration information in the address space of the computing device;
skip PCI enumeration of the PCIe devices; and
present the PCI enumeration information in the address space in the memory of the computing device to the operating system (OS) of the computing device in order that the OS maintains the PCIe devices using the PCI enumeration information.

7. The computer program product of claim 6, wherein the address space in the memory of the computing device is at least one of an input/output (I/O) port address space or a memory-mapped address space.

8. The computer program product of claim 6, wherein the PCI enumeration information is initially populated in the processor register in the processor by the computer readable program causing the computing device to:
responsive to the computing device being powered on, identify PCI slots that have PCIe devices installed;
read a Device ID (DID) register and Vendor ID (VID) register for each combination of bus number and PCIe device number;
for each PCIe device that responds to the reading of the DID register and the VID register:
responsive to receiving a response from a PCIe device, run a bus enumeration process;
program one or more addresses into the address space there by forming the PCI enumeration information; and
store the PCI enumeration information in the processor register in the processor; and
present the PCI enumeration information to the operating system (OS) of the data processing in order that the OS maintains the PCIe devices using the PCI enumeration information.

9. The computer program product of claim 8, wherein, in running the bus enumeration process, the response from the PCIe device causes all ones to be written to the address space for that PCIe device.

10. The computer program product of claim 8, wherein the computer readable program further causes the computing device to:
for each failure in reading of the DID register and the VID register for a particular combination of bus number and PCIe device number:
perform an abort; and
return an all-bits-on value indicating that no working PCIe device exists on that bus number and PCIe device number.

11. An apparatus comprising:
a processor; and
a memory coupled to the processor, wherein the memory comprises instructions which, when executed by the processor, cause the processor to:
responsive to a reset of the apparatus, read Peripheral Component Interconnect (PCI) enumeration information for a set of Peripheral Component Interconnect (PCI) Express (PCIe) devices coupled to the apparatus from a processor register in the processor of the apparatus wherein, in the reset of the apparatus, all power within the apparatus has not gone down and the PCI enumeration information in the processor register in the processor of the apparatus is maintained and wherein, in the reset of the apparatus, the PCI enumeration information in an address space in a memory of the apparatus is lost;
store the PCI enumeration information in the address space in the memory of the apparatus;
skip PCI enumeration of the PCIe devices; and
present the PCI enumeration information in the address space in the memory of the apparatus to the operating system (OS) of the apparatus in order that the OS maintains the PCIe devices using the PCI enumeration information.

12. The apparatus of claim 11, wherein the address space in the memory of the apparatus is at least one of an input/output (I/O) port address space or a memory-mapped address space.

13. The apparatus of claim 11, wherein the PCI enumeration information is initially populated in the processor register in the processor by the instructions further causing the processor to:
responsive to the apparatus being powered on, identify PCI slots that have PCIe devices installed;
read a Device ID (DID) register and Vendor ID (VID) register for each combination of bus number and PCIe device number;
for each PCIe device that responds to the reading of the DID register and the VID register:
responsive to receiving a response from a PCIe device, run a bus enumeration process;

program one or more addresses into the address space there by forming the PCI enumeration information; and store the PCI enumeration information in the processor register in the processor; and present the PCI enumeration information to the operating system (OS) of the data processing in order that the OS maintains the PCIe devices using the PCI enumeration information.

14. The apparatus of claim 13, wherein, in running the bus enumeration process, the response from the PCIe device causes all ones to be written to the address space for that PCIe device and wherein the instructions further cause the processor to:

for each failure in reading of the DID register and the VID register for a particular combination of bus number and PCIe device number:

perform an abort; and return an all-bits-on value indicating that no working PCIe device exists on that bus number and PCIe device number.

* * * * *